INVENTORS:
ROBERT L. MAGOVERN
HAROLD C. RIES
IRWIN L. BREIER
BY: Alan C. Batchelder
THEIR AGENT INVENTORS:
ROBERT L. MAGOVERN
HAROLD C. RIES
IRWIN L. BREIER
BY: Alan C. Batchelder
THEIR AGENT INVENTORS:
ROBERT L. MAGOVERN
HAROLD C. RIES
IRWIN L. BREIER
BY: Alan C. Batchelder
THEIR AGENT

United States Patent Office 3,006,731
Patented Oct. 31, 1961

3,006,731
PROCESS FOR THE RECOVERY OF IODINE
Robert L. Magovern, El Cerrito, Harold C. Ries, Berkeley, and Irwin L. Breier, Lafayette, Calif., assignors to Shell Oil Company, a corporation of Delaware
Filed Oct. 29, 1957, Ser. No. 693,163
16 Claims. (Cl. 23—216)

This invention relates to a process suitable for use on a large scale for recovering the iodine content of aqueous solutions of hydrogen iodide.

The art provides no practically feasible process suitable for use on a large scale for effecting the recovery of the iodine contained in mixtures comprising at least the first two of hydrogen iodide, water and iodine. Mixtures of hydrogen iodide and water—and particularly such mixtures containing some iodine—are extremely reactive. Thus, methods for recovery of iodine from such mixtures involving the use of selective solvents or the like have not been found to be entirely feasible, because the solvents are decomposed by the hydrogen iodide-water or hydrogen iodide-water-iodine mixtures to be treated, at practically useful temperatures. Further, such hydrogen iodide-water and hydrogen iodide-water-iodine mixtures are extremely corrosive to the usual metals used in construction of process equipment. To handle such mixtures satisfactorily, the surfaces of process equipment in contact with those mixtures must be made of very inert metals, such as tantalum, platinum, gold, special alloys, or the like, or they must be made of such inert materials as plastics, resinous materials, glass, ceramics or carbon. Process equipment containing such metals is expensive and difficult to fabricate. Process equipment containing glass, ceramics or the like, also is very difficult to fabricate and to maintain, inasmuch as such materials are fragile and are vulnerable to thermal shock. Plastics, resinous materials, glass and ceramic materials also have the further objectionable characteristic of very poor heat transfer coefficients, so that process equipment involving the use of such materials for conductive heat transfer, as in heat exchangers, distillation column reboilers and the like, have very poor efficiency. Formed carbon materials, such as the resin bonded carbon materials known as "Karbate" and "Impervite" or the like, have excellent heat transfer characteristics, but are extremely fragile, so use of such materials is very restricted.

Figure 1:
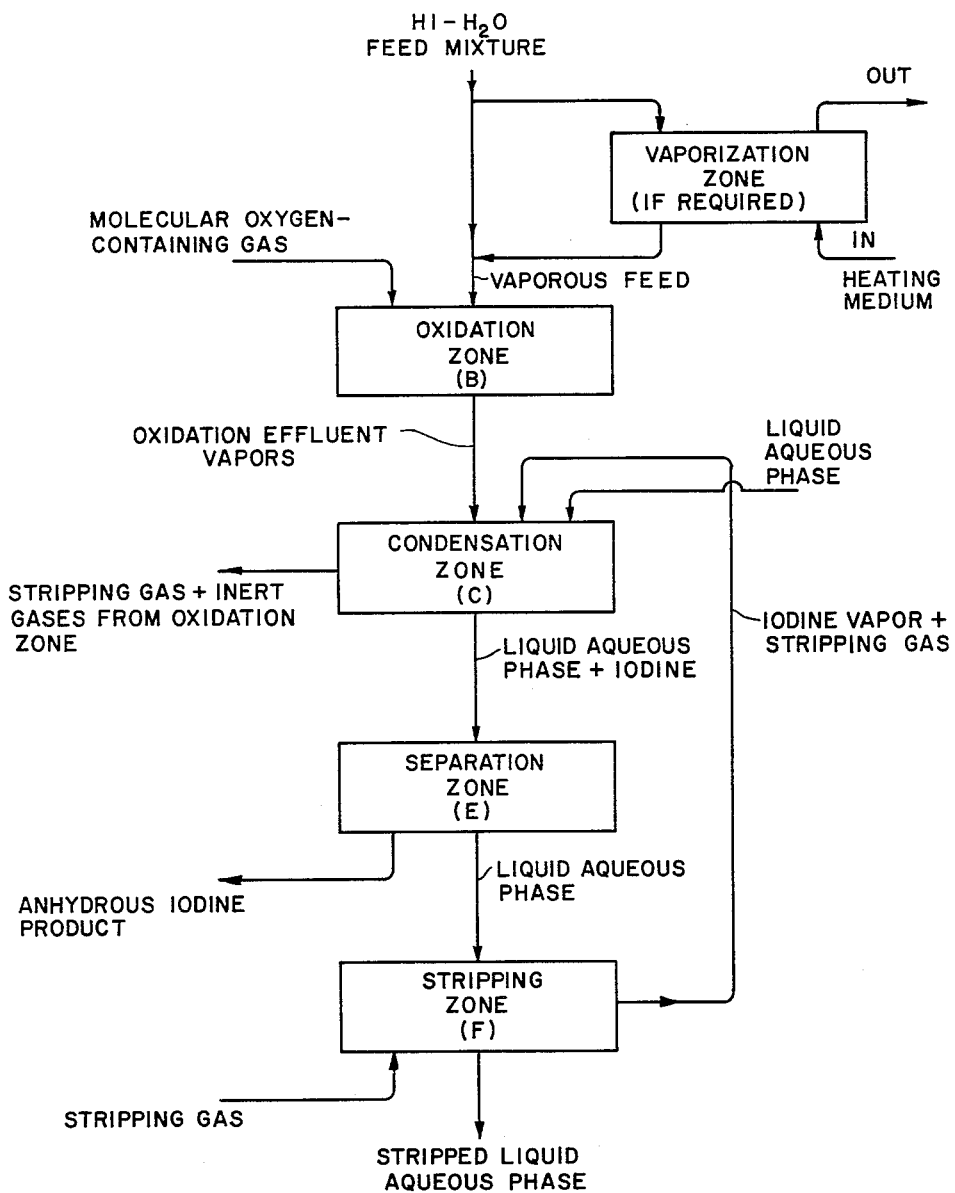
Figure 2:
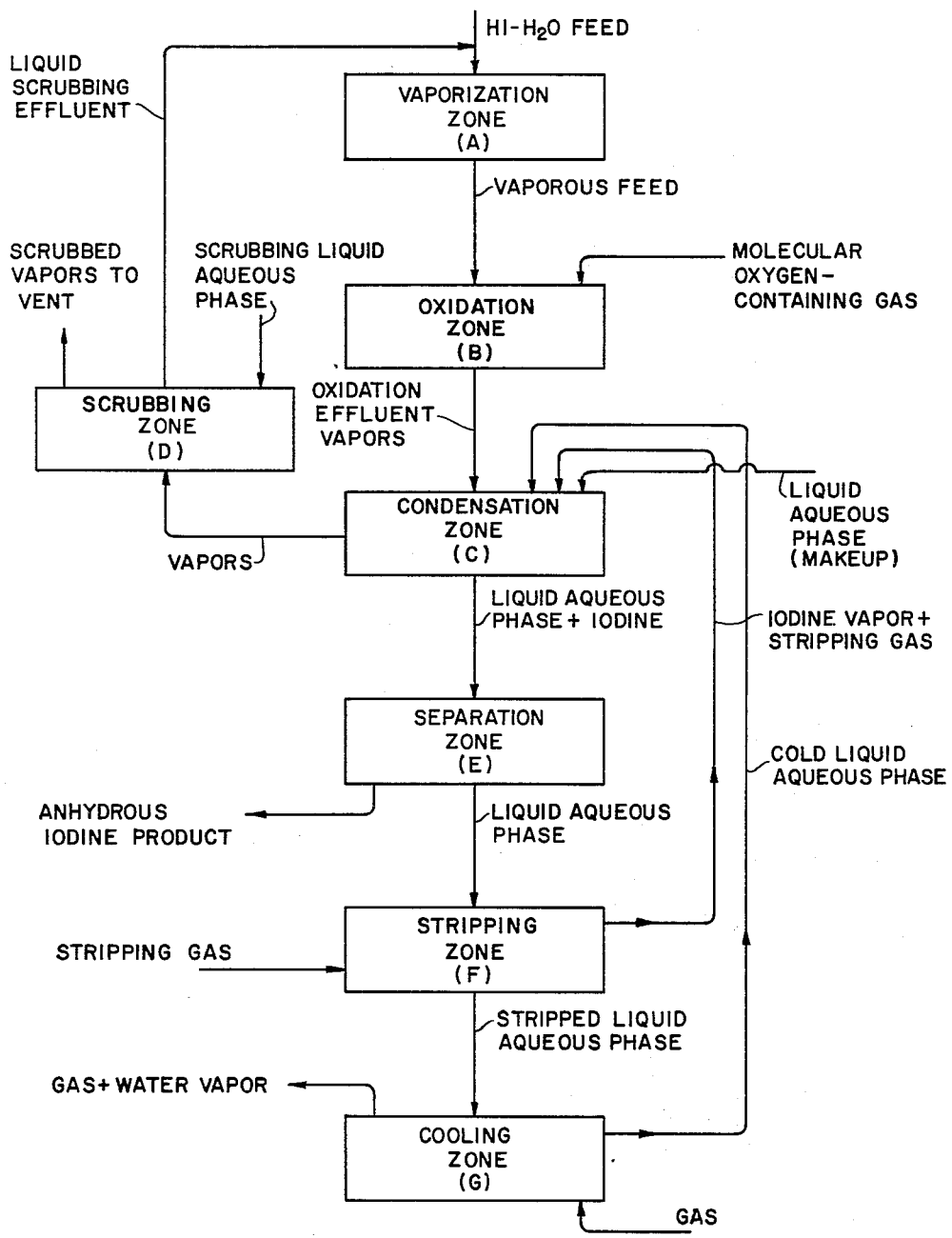
Figure 3:
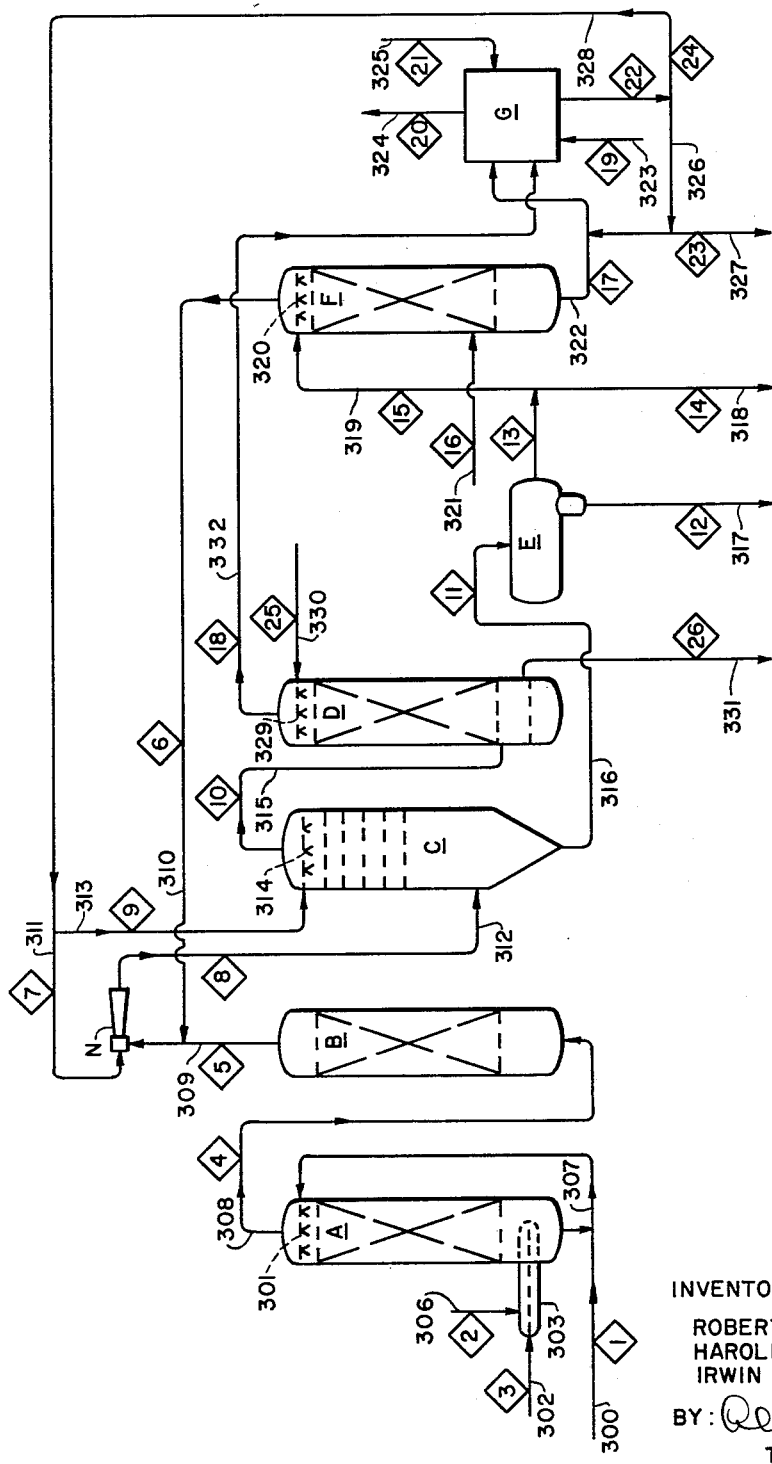

It is the principal object of this invention to provide a process adapted to the recovery, on a commercial scale, of the iodine content of hydrogen iodide-water mixtures and of hydrogen iodide-water-iodine mixtures. The manner in which this object is attained by the process of this invention will become apparent from the following description of the invention, which will be made with reference to the accompanying drawings, which form a part of this specification. In these drawings, FIGURE 1 is a schematic representation of the essential process steps which form the process of the invention, FIGURE 2 is a schematic representation of the preferred aspect of that process, and FIGURE 3 is a schematic representation of a particular embodiment of that process.

In accordance with this invention we have discovered a process for recovering the total iodine content of hydrogen iodide-water and hydrogen iodide-water-iodine mixtures wherein all of the necessary operations are so conducted that no conductive heat transfer surface is required, and at substantially constant temperature levels, so that thermal shock is not encountered to any significant degree. Under these conditions, process equipment using plastics, resins, glass, ceramics, or carbon in structurally strong form, resistant to damage by conditions ordinarily encountered in the use of such equipment, is quite feasible, and causes no loss of efficiency. According to our new process, the hydrogen iodide in mixtures of hydrogen iodide and water, and, if present, iodine, is converted substantially quantitatively to iodine and all of the iodine in the resulting mixture is efficiently recovered in a pure, substantially anhydrous state. Our new process thus is ideally adapted to recovery of the total iodine content of hydrogen iodide-water mixtures, including hydrogen iodide-water-iodine mixtures, on as large a scale as may be desirable.

Briefly, our new process comprises reacting, in vapor phase, a hydrogen iodide-water mixture, optionally containing iodine, with a molecular oxygen-containing gas to substantially quantitatively oxidize the hydrogen iodide in that mixture to iodine, contacting the resulting vapors with an aqueous liquid to condense the iodine therein, separating the condensed iodine from the aqueous liquid, to give pure, substantially anhydrous iodine as product, contacting the aqueous liquid with a gas to strip the iodine therein into the gas, and passing the resulting iodine-containing gas to the zone wherein the vapors from the oxidation step are contacted with aqueous solution, to condense the iodine from said gas. If the original feed mixture is a liquid, it is vaporized by direct contact with a hot gas, as will be hereinafter described in detail.

Expressed in more formal terms, our new process comprises a process for recovering as substantially anhydrous iodine the total iodine content of a mixture essentially comprised of at least the first two of hydrogen iodide, water and iodine, comprising contacting said mixture in an oxidation zone, in vapor phase, with a molecular oxygen-containing gas, and thereby oxidizing substantially quantitatively the hydrogen iodide in said mixture to iodine, directly contacting in a condensation zone the resulting vaporous mixture with a liquid aqueous phase, and thereby condensing the iodine therein, passing the resulting condensed mixture, comprised primarily of iodine and a liquid aqueous phase, to a separation zone wherein iodine is separated as an immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, and passing the effluent gases, containing iodine, from the said stripping zone to the aforesaid condensation zone, wherein the iodine in said effluent gases is condensed.

The generic aspect of our new process is illustrated in the accompanying drawing, FIGURE 1, which sets out in schematic, self-explanatory form the sequence of steps in the generic aspect of our process described in the two immediately preceding paragraphs.

It will be noted that in the new process, all operations, (and particularly all operations involving heat transfer)

are conducted by way of direct contact between process streams. Thus, oxidation of the hydrogen iodide is carried out directly by reaction with a molecular oxygen-containing gas, the product iodine is condensed by direct contact with an aqueous liquid, the product iodine is recovered by simple phase separation of the substantially immiscible iodine and aqueous phases and the little iodine that dissolves in the aqueous phase is recovered by direct stripping of the aqueous phase with a gas and passage of the iodine-containing gas to the condensation step wherein the iodine is condensed by direct contact with the liquid aqueous phase. By conducting the process in this way, no conductive heat transfer surface is required, and the major process equipment consists merely of metal reactors lined with glass or ceramic material. Such equipment is physically strong, of long life in use and is easily fabricated.

The new process is effective for recovering the iodine contained in any mixture of hydrogen iodide, whether the concentration of hydrogen iodide be small, i.e., in the order of one or two percent by weight, or whether it be large, i.e., of the order of the concentration of hydrogen iodide in a constant boiling hydrogen iodide-water mixture. From the standpoint of practical operating efficiency, of course, it is desirable that the hydrogen iodide-water mixture contain as high a concentration of hydrogen iodide as is practically and economically feasible. Compounds other than hydrogen iodide and water may be present, provided that such other compounds are substantially inert in the oxidation zone of the new process and do not cause difficulty in the various zones of the new process involving physical separations. Thus, where process streams comprising gaseous hydrogen iodide-water mixtures are treated, inert diluents such as nitrogen, helium or other of the inert gaseous elements, or the products of combustion, such as carbon dioxide, carbon monoxide and the like, may be present. Also, organic materials may be present in such process streams. Preferably, such organic materials are not reactive with either or both of hydrogen iodide and iodine at the oxidation temperatures employed. Also, preferably the organic materials present in those process streams are reactive with molecular oxygen, at the temperatures used, to convert any iodide content of such materials to elemental iodine. It has been found that the presence of substantial amounts of of iodine in the hydrogen iodide-water mixtures to be treated does not adversely affect the oxidation of hydrogen iodide to iodine, so that the new process is effective in recovering the total iodine—both iodine per se, and iodine as hydrogen iodide—of hydrogen iodide-water-iodine mixtures.

The various operations which comprise the new process may each be carried out individually, or they may be carried out to some extent simultaneously. Considering, as a typical example of a suitable hydrogen iodide-water mixture, a liquid mixture containing substantial amounts of each of hydrogen iodide, water and iodine, the liquid may first be vaporized in a separate vaporization zone, the hydrogen iodide oxidized in a separate oxidation zone, the resulting iodine condensed in a separate condensation zone, the condensed iodine recovered in a separate separation zone, the iodine in the condensation liquid recovered in a separate stripping zone and the stripped liquid returned to the condensation zone.

When such a mode of operation is contemplated, the vaporization of the liquid is accomplished, according to the intent and to accomplish the objectives of this invention, by contacting the liquid directly with a hot gas, the resulting vaporous mixture being then sent on to the oxidation zone. The necessary liquid-gas contact may be effected by spraying the liquid into the gas, or through the use of mechanical contact devices, such as grid trays, disc and doughnut trays packed columns or the like, in which the parts thereof in contact with process streams are easily fabricated from, or are easily protected by, acid-resistant materials. The objectives of this invention are best realized by flowing the liquid to be vaporized downwardly through a porous bed of refractory bodies, such as pebbles, stones, bricks, ceramic chips, formed ceramic shapes, or the like, through which hot gaseous products of the combustion of a fuel are being passed upwardly, the bed of refractory bodies being positioned in a container of restricted cross-sectional area, the surfaces of which that are in contact with the process streams being made of an inert material such as glass, a ceramic material or a carbon material. It is evident that this method of conducting the vaporization is ideally suited to the vaporization of liquids which are highly corrosive to metals, inasmuch as it provides excellent heat-transfer efficiencies, and enables the use of simple, physically strong, damage-resistant process equipment. A detailed description of the use of such an evaporation method for vaporization of hydrogen iodide-water and hydrogen iodide-water-iodine mixtures and an improved apparatus for conducting that vaporization are given in copending application Serial No. 636,637, filed January 28, 1957, now U.S. Patent 2,893,359, issued July 7, 1959.

The oxidation of the hydrogen iodide in the resulting vaporous mixture can be effected, according to the intent and to accomplish the objectives of this invention, by several techniques. Thus, the vaporous mixture can be admixed with a molecular oxygen-containing gas and the admixture passed through a free-space reactor at a temperature of the order of about 600° C. However, the reaction temperature required can be reduced substantially—to the order of from about 200° C. to about 400° C.—and yet obtain substantially quantitative oxidation of the hydrogen iodide to iodine in residence times not exceeding about one minute by passing the mixture to be reacted through a porous bed of an inert, non-catalytic substantially non-porous solid contact material having a large geometric surface area, maintained at the desired reaction temperature. Suitable contact materials include any of the glass and ceramic materials commonly classed as the refractory materials, and including, in addition to siliceous materials, silicon carbide, aluminaceous materials such as fused clays, Alundum and corundum, boron nitride, firebrick, naturally occurring stony materials, and the like. In this method for oxidizing hydrogen iodide to iodine, a reaction temperature of at least about 100° C. is used. The amount of the molecular oxygen-containing gas is at least sufficient to provide the amount of molecular oxygen theoretically required to oxidize all of the hydrogen iodide to iodine; preferably at least a 5% excess of molecular oxygen over that theoretically required is provided. Residence times of from about seven seconds (at temperatures of about 400° C.) to about 20 seconds (at temperatures of about 250–300° C.) normally result in substantially quantitative oxidation of the hydrogen iodide to iodine. Details of this process for conducting the oxidation of hydrogen iodide are set out in copending application Serial No. 602,434, filed August 6, 1956, now U.S. Patent 2,965,-452, issued Oct. 20, 1960.

Still further advantage, from the standpoint of reducing both reaction temperature and reaction time, is obtained by employing a catalyst in the oxidation zone. A variety of materials are suitable for catalyzing the reaction between hydrogen iodide and molecular oxygen. A preferred class of catalysts for this reaction comprises solid materials having substantial intrinsic surface acidity, such as the acid clays, silica-alumina catalysts used for the cracking of hydrocarbons and the like. Suitable reaction temperatures when using these preferred catalysts lie within the range of from about 50° C. to about 400° C., provided the reaction mixture is maintained as a vapor. Usual reaction temperatures are from about 100° C. to about 300° C. The precise character of catalysts of this type and the manner in which they are used are set out in detail in copending application Serial No. 618,456, filed October 26, 1956, now U.S. Patent 2,892,686, issued June 30, 1959. Yet another particularly desirable class of catalysts available for this reaction are the porous, substantially neutral solid materials having high surface area-to-weight ratios, such as the various neutral clay materials, neutral silica gels, neutral aluminas, the calcined diatomaceous earths and the like. Suitable reaction temperatures for use with these catalysts likewise are within the range of from about 50° C. to about 400° C., with the reaction mixture maintained in vapor phase, optimum temperatures being within the range of from about 100° C. to about 300° C. The precise character of this class of catalysts and the manner in which such catalysts are used, are set out in detail in copending application Serial No. 634,624, filed January 17, 1957, now U.S. Patent 2,892,687, issued June 30, 1959. When using either of these latter two classes of catalysts, at least the amount of molecular oxygen theoretically required to oxidize all of the hydrogen iodide, and preferably a 5% excess over this minimum, is used. Typical residence times for the attainment of substantially quantitative oxidation of the hydrogen iodide lie within the range of from about one to about ten seconds.

We have found, also, that the metal halides, and other compounds which are known in the art to be catalysts for the vapor phase oxidation of hydrogen chloride to chlorine by the well-known Deacon process are suitable catalysts for use in the process of the invention for conversion of hydrogen iodide to iodine. These suitable catalytic materials thus are those known in the prior art as "Deacon process catalysts" or simply as "Deacon catalysts." The precise nature of these catalysts is set out in detail in U.S. Patent No. 2,395,314, issued February 19, 1946. The manner in which these catalysts are to be used in effecting the oxidation of hydrogen iodide to iodine will be evident from the disclosures of this patent.

In accordance with the invention, the iodine in the vapor effluent from the oxidation zone is condensed by contacting the vapor effluent directly with a liquid aqueous phase. The necessary liquid-gas contact may be effected by spraying the liquid into the gas, or through the use of mechanical contact devices, such as grid trays, disc and doughnut trays, packed columns or the like, in which the parts thereof in contact with process streams are easily fabricated from, or are easily protected by acid-resistant materials. It has been found that the necessary liquid-vapor contact is obtained conveniently and effectively, using very simple rugged process equipment, by spraying the liquid aqueous phase into the vapors, a ceramic- or glass-lined vessel being used. Desirably, the vessel is equipped with grid trays, disc and doughnut trays, or like devices for insuring intimate gas-liquid contact, or is packed with a porous bed of a refractory, ceramic or glassy material in a zone below the spray equipment to increase the extent of the vapor-liquid contact. It also has been found, in accordance with the invention, that another convenient way of effecting the condensation of the vaporous iodine is to pass the vapors and the liquid aqueous phase into a nozzle wherein the vapors and liquid are thoroughly mixed, thereafter passing the vapor-liquid mixture through a zone of restricted cross-sectional area (such as a pipe) wherein highly turbulent flow conditions are maintained, and thereafter ejecting the mixture into a vessel packed with a contact material as described immediately above. In some cases, it will be found most convenient and effective to employ a combination of a spray-contact technique, a quench nozzle-technique, and a packed bed-contact technique. As the liquid aqueous phase, there may be used pure water, or there may be used aqueous solutions containing one or more solutes which do not interfere with any of the later operations through which the aqueous solutions must pass in our new process. Preferably, if not pure water, the aqueous solution contains no materials other than water, hydrogen iodide and iodine. As will be pointed out hereinafter, it is in many cases advantageous to recycle water in the process of the invention, so that the liquid aqueous phase used in the condensation of the iodine is the cooled aqueous phase obtained as one of the final products of the process of our invention. This product aqueous phase normally contains a small amount of hydrogen iodide. The condensation of the iodine may be carried out under such conditions that the iodine product is either liquid or solid. Because liquid iodine is more easily handled than is solid iodine, it is preferred that the condensation be carried out at such conditions of temperature and pressure that the condensed iodine is liquid. Thus, it is desirable to conduct the condensation at superatmospheric pressures sufficient to keep the condensate temperature above the melting point of iodine (113.7° C.).

The condensate, comprising a liquid aqueous phase and an iodine phase immiscible therewith, is then sent to a separation zone, wherein the iodine phase is separated and recovered as product. It will be evident that in some cases, it will be most convenient to use a combined condensation and separation zone. Thus, where condensation is effected by spraying the liquid aqueous phase into the vapors, or where the liquid and vapor are contacted in a quench nozzle or the like, or where the liquid and vapor are contacted in a packed bed of inert contact material, it may be most convenient to provide a zone in the bottom of the vessel used in effecting the liquid-vapor contact wherein the immiscible iodine phase may collect and from which it may be withdrawn as product.

Iodine is significantly soluble in water, and is even more soluble under the same conditions if hydrogen iodide is present. In accordance with the invention, the liquid aqueous phase from the separation zone is suitably treated to recover the iodine therein. It has been found that this is most easily accomplished by simply intimately contacting the liquid aqueous phase with a gas, which strips the iodine from the liquid, and passing the effluent gas, containing the iodine, into the condensation zone, wherein the iodine is condensed at the same time the iodine in the oxidizer effluent is considered. The necessary liquid-gas contact may be effected by spraying the liquid into the gas, or through the use of mechanical contact devices, such as grid trays, disc and doughnut trays, packed columns or the like, in which the parts thereof in contact with process streams are easily fabricated from, or are easily protected by, acid-resistant materials. Preferably, because of the simplicity of the equipment required, the liquid is passed downwardly through a porous bed of glassy, ceramic or refractory materials against the gas passing upwardly through that bed. Any gas that is substantially insoluble in the absorption system may be used as the stripping gas. Thus, air may be used, or the gas may be pure nitrogen, helium or the like. Steam also is suitable. Although the steam may be generated in situ in the stripping zone, by means of a reboiler for the liquid effluent from the bottom of the stripping zone, such a manner of operation is not preferred, inasmuch as the liquid effluent from the stripping zone often will contain some hydrogen iodide, due to incomplete oxidation of the hydrogen iodide in the oxidation zone. This liquid would be somewhat more corrosive than pure water alone, so it is preferred that where steam is used as the stripping gas, the steam be generated from pure water, externally, and then passed into the stripping zone to avoid use of a reboiler which would be subject to corrosion.

It will be noted that in the preceding description, and in FIGURE 1, the molecular oxygen-containing gas used to oxidize the hydrogen iodide is introduced into the oxidation zone. Where the vaporization of a liquid feed mixture is effected by the preferred method—direct contact of the liquid with the hot gases resulting from combustion of a fuel—the molecular oxygen-containing gas may be provided in the vaporization zone, as by providing sufficient of the molecular oxygen-containing gas to both burn the fuel and to oxidize the hydrogen iodide.

Instead of conducting the oxidation of the hydrogen iodide in the manner hereinbefore described, that oxidation alternatively can be effected, in accordance with one of the embodiments of the invention, by burning a mixture of the hydrogen iodide-containing vapors and a molecular oxygen-containing gas. Thus, the hydrogen iodide-containing vapors can be mixed with an amount of an oxygen-containing gas, such as air or pure molecular oxygen, sufficient to provide at least the amount of molecular oxygen theoretically required to react with the hydrogen iodide, the resulting mixture passed to a burner contained in a suitable vessel, ignited, and permitted to burn. This method of conducting the oxidation of the hydrogen iodide is applicable where the concentration of hydrogen iodide and molecular oxygen in the mixture of the hydrogen iodide containing vapors and a molecular oxygen-containing gas are such that combustion of the mixture will occur. (The resulting iodine is recovered in the same manner hereinbefore described for recovery of the iodine in the oxidation zone effluent.) For this purpose, any of the usual types of burners used for burning gaseous fuels may be used, provided that the parts of the burner in contact with the hydrogen iodide-containing gases are made of suitable ceramic or other acid resistant material. Typical burner designed is described and illustrated in Perry, "Chemical Engineers' Handbook," McGraw-Hill, 3rd edition, 1950, in the subsection thereof at pages 1575–1596, entitled "Gaseous Fuels."

If desired, instead of separately vaporizing a liquid hydrogen-iodide-containing mixture, that mixture may be vaporized in situ in the burner, so that vaporization of the liquid and oxidation of the hydrogen iodide therein occur in the same operation. Vaporization of the liquid in the burner is accomplished by feeding to the burner sufficient fuel and molecular oxygen-containing gas to burn that fuel and to vaporize the liquid mixture and sufficient molecular oxygen-containing gas to oxidize the hydrogen iodide. The design of burners suitable for this purpose is set out in U.S. Patents Nos. 2,532,687 and 2,562,874, issued December 5, 1950 and July 31, 1951, respectively. Again, the parts of the burner in contact with the hydrogen iodide-containing liquid would have to be made of suitable ceramic or other acid resistant material. This procedure also is applicable to the oxidation of the hydrogen iodide in hydrogen iodide-containing vapors wherein the concentration of hydrogen iodide and molecular oxygen in a mixture of the hydrogen iodide-containing vapors and a molecular oxygen-containing gas are such that combustion of the mixture will not occur.

In accordance with a further embodiment of the invention, simultaneous oxidation of the hydrogen iodide, and condensation of the resulting iodine can be effected. In this embodiment, there may be employed a procedure that may be referred to as submerged combustion. In this procedure, an admixture of the hydrogen iodide-containing vapors and a molecular oxygen-containing gas is passed to a burner submerged in a liquid aqueous phase. The admixture is ignited and burned, the gases resulting from the burning being immediately contacted with the liquid aqueous phase, and iodine being condensed thereby. The principles of submerged combustion, the design of suitable burners and other aspects of submerged combustion practice are discussed by Swindin in "Industrial Chemist," volume 26, pages 25–28 (1950); this article also describes a suitable burner. It will be noted that in this case, also, it may be convenient to directly combine the condensation and separation zones, since the iodine will be condensed by the liquid aqueous phase, will be immiscible therewith, and therefore may be allowed to separate and collect in a separate zone in the vessel used in effecting the submerged combustion. In this case, the oxidation zone (optionally, the vaporization zone), the condensation zone and the separation zone are all located in a single vessel.

Where a liquid hydrogen iodide-containing mixture is the original feed and it is vaporized by means of hot combustion gases and/or where the molecular oxygen-containing gas used to oxidize the hydrogen iodide is air (or where an excess of pure oxygen is used in the oxidation step), vaporous material is withdrawn from the condensation zone. Usually, these vaporous materials include substantial amounts of either or both of hydrogen iodide and iodine. These iodine-containing materials must be recovered. This recovery is most conveniently and effectively accomplished by simply scrubbing the vaporous materials with a liquid aqueous phase before they are vented, then vaporizing the resulting liquid scrubbing effluent and passing the vapors to the hydrogen iodide oxidation zone. Alternatively, the iodine content of the liquid may be recovered by contacting the liquid with activated charcoal, which selectively adsorbs the iodine. The adsorbed iodine then may be recovered by methods known in the art, including steam stripping, solvent extraction, or the like.

Also, in some cases, as where the process is not being operated correctly, complete oxidation of hydrogen iodide to iodine may not occur. In such cases, the hydrogen iodide will pass through the condensation and stripping zones and will be present in the stripped liquid aqueous phase. To insure that this hydrogen iodide will not be lost, it is desirable that the stripped liquid aqueous phase be cooled and the cooled liquid used as the condensing liquid in the condensation zone. Cooling of the hot stripped liquid aqueous phase is most effectively accomplished by use of direct evaporation cooling techniques—the hot liquid contacted with a gas, such as air, evaporation of the water in the liquid occurs, effectively reducing the temperature of the liquid. It has been found that the vapor pressure of hydrogen iodide over dilute aqueous solutions thereof is so low that substantially none of the hydrogen iodide in the aqueous liquid is lost in this technique of cooling that liquid. Alternatively, the liquid may be cooled by passing it to a vessel in which a vacuum is maintained by means of a steam ejector.

This aspect of our new process is illustrated in the accompanying drawing, FIGURE 2, which sets out in schematic self-explanatory form the sequence of steps described immediately hereinbefore which comprise this aspect of the new process.

This completes the general description of our new process. It is to be understood that the pertinent portions of the copending applications mentioned herein are hereby incorporated into this specification by the references thereto; this form of description of the new process has been chosen to concisely set out that process, yet to provide the complete description of that process requisite to its practice by one skilled in the art.

It will be evident from the preceding description that the process of the invention may be carried out in a batchwise manner. However, the process of the invention is in most cases most efficiently conducted in a continuous manner.

Use of the new process in a continuous manner in a particular case is illustrated in the accompanying drawing, FIGURE 3. In this drawing, the suitable major pieces of process equipment have been set out schematically, with the flow of process streams between these pieces of equipment indicated by lines. The drawing is not to scale, and to simplify the description, various pieces of accessory equipment, such as valves, pumps and instruments, which may be desirable or even necessary for operation of the process but which readily can be provided as required and desired by those skilled in the art, and which are not essential to the description of the process, have been omitted.

The processing zones are identified by letters, the letter used to designate each zone being the same letter that identifies that same zone in FIGURES 1 and 2.

The feed stream from which iodine is to be recovered is a liquid mixture of hydrogen iodide, iodine and water resulting from the dehydrogenation by iodine of an organic material. For reasons having to do with the dehydrogenation process, and which are not related to the present invention, certain process streams, which otherwise would be treated in the appropriate portions of the process of this invention, as described hereinbefore, are returned to the dehydrogenation process. Table I shows specific conditions, flow rates and stream compositions for the treatment of the incoming feed stream.

In describing the process equipment exemplified in FIGURE 3 for brevity's sake, the lining of various pieces of that equipment is described as "inert" and in some of the equipment, the material in packed beds therein is also described as "inert." In this usage, the term "inert" means that the material described by that term is not significantly subject to attack by the process stream in contact with it. Regarding the materials from which the lining of the process equipment is made, inert materials include glass, various ceramic materials, unfilled phenolic thermosetting resins, such as that sold commercially under the trade-name, "Chemplas," thermosetting phenolic or furan resins filled with graphite or asbestos, sold commercially under the trade-name, "Haveg," polyvinyl chloride plastics, fluorocarbon plastics such as that sold under the trade-name "Kel F," resin-impregnated graphites, such as those sold commercially under the trade-names, "Karbate" and "Impervite," or formed graphite, such as that sold under the trade-name "Graph-I-Tite." Suitable packing materials include naturally occurring stony materials, fragments, pieces or formed shapes of ceramic materials, including stoneware rings, Berl saddles, and the like.

In FIGURE 3, vaporization zone (A) is a vertically disposed cylindrical vessel lined with an inert material. Positioned in the central part of that vessel is a porous bed of inert material. Positioned above the bed is means for distributing a liquid over the top of the bed. A burner for burning a fuel with air, or other molecular oxygen-containing gas, is positioned below the bed in such a position that products of combustion are ejected into the vessel below the packed bed. An exit for liquid is provided at the bottom of the vessel; an exit for vapor is provided at the top of the vessel.

Oxidation zone (B) is a vertically disposed cylindrical vessel lined with an inert material, in the central portion of which a porous bed of a solid catalyst is positioned. A vapor exit is provided at the top of the vessel and a vapor inlet is provided at the bottom of the vessel. The solid catalyst suitably is one of the solid catalysts described hereinbefore.

N is a quench nozzle made of acid-resistant material wherein the vapors from the oxidation zone (B) are desuperheated.

Condensation zone (C) is a vertically disposed cylindrical vessel lined with an inert material. At an intermediate point therein, an inlet is positioned to permit entry of the effluent from the quench nozzle (N) into the vessel. A liquid exit is provided at the bottom and a vapor exit is provided at the top of the vessel. A porous bed of inert material is positioned in an intermediate part of the vessel above the point at which the effluent from the quench nozzle (N) enters the vessel. At a point somewhat below the top of the vessel, provision is made for entry of a liquid and for distributing that liquid over the top of the bed of inert material.

Scrubbing zone (D) is a vertically disposed cylindrical vessel lined with an inert material. Positioned in the central portion of the vessel is a porous bed of inert material. A liquid exit is provided at the bottom of the vessel. Above the bed of inert material is provision for entry of a liquid and means for distributing that liquid over the top portion of said bed of inert material. A vapor inlet is provided at a point above the bottom of the vessel but below the bed of inert material and a vapor exit is provided at the top of the vessel.

The separation zone (E) is a horizontally disposed cylindrical vessel lined with an inert material. Provision for liquid entry is provided at the top or the end of the vessel; provision for decantation and removal of liquid is provided at the bottom of the vessel and at an intermediate point in the vessel.

In some cases, to reduce the number of pieces of process equipment required, it may be desirable to incorporate the separation zone (E) and the condensation zone (C) into a single vessel.

The stripping zone (F) is a vertically disposed cylindrical vessel lined with an inert material and containing a centrally positioned porous bed of inert material. Provision is made for vapor exit at the top of the vessel and liquid exit at the bottom of the vessel. Provision also is made for entry of liquid and distribution of that liquid over the top of the bed of contact material, and for entry of a vapor below the bed of inert material but above the bottom of the vessel.

It is to be understood that in the foregoing description of the process equipment used in a typical embodiment of the process of this invention, where a bed of inert material is used for effecting intimate contact between liquid and vapor streams, other suitable vapor-liquid contact means, such as grid trays or disc-and-doughnut trays made of acid resistant materials, may be substituted for the bed of inert material without departing from the spirit of this invention.

Cooling zone (G) is an evaporative type cooling tower of conventional design, lined with an inert material. Provision is made for entry of hot liquid, exit of cold liquid, entry and exit of the cooling gas.

In the operation of the embodiment of the process illustrated in FIGURE 3, the liquid hydrogen iodide-water-iodine feed mixture (stream 1) enters the system through line 300. The liquid is distributed over the bed of contact material in vessel A by a distributing means, 301. Vaporous fuel (stream 3) enters through line 302 and is burned in burner 303 with air (stream 2) entering through line 306. Liquid not vaporized is recycled via line 307 to the distributing means 301. The vapors (stream 4) are passed through line 308 to the oxidizer vessel, B, wherein the hydrogen iodide is reacted with molecular oxygen introduced with the air (stream 2) through line 306. The effluent vapors (stream 5) are passed (via line 309), together with the vapors (stream 6) from the stripping vessel, F, (via line 310) to the quench nozzle, N, wherein the vapors are quenched with cool water (stream 7) entering through line 311. The vapor-liquid mixture from quench nozzle in (stream 8) passes via line 312 into condenser vessel, C. Additional cool water (stream 9) is added via line 313 to distributing means 314 in vessel C to further contact the vapors passing upwardly through vessel C. The cooled and scrubbed vapors (stream 10) are withdrawn and passed via line 315 to the scrubbing vessel D. The condensate (stream 11) is passed via line 316 to separation vessel, E, wherein iodine is separated from the aqueous phase. Product iodine (stream 12) is withdrawn via line 317 and returned to the dehydrogenation process. The aqueous phase from separator (E) (stream 13) is divided into two parts. One part (stream 14) is returned to the dehydrogenation process via line 318. The other part (stream 15) is passed via line 319 to distributing means 320 in stripping vessel, F. Steam (stream 16) is introduced into vessel F via line 321. The iodine-rich steam (stream 6) passes from vessel F to the quench nozzle, N, via line 310. The stripped aqueous liquid (stream 17) is passed via line 322 to cooler G, wherein it is cooled by partial evaporation of water. Vapors from the scrubber D (stream 18) enter the cooler G via line 322. Air, to effect evaporation of part of the water in the liquids entering the cooler, and thus to cool those liquids, enters the cooler as stream 19 through line 323. The moist air (stream 20) is vented via line 324. Make-up water (stream 21) is provided via line 325. The cooled aqueous phase (stream 22) is partially recycled via lines 326 and 322, to hold down the temperature of the liquid entering the cooler, G. The remainder of the cooled aqueous phase, (stream 22), is divided into two streams: stream 23, which is passed via line 327 to the dehydrogenation process and stream 24 which is passed via line 328 to the quench nozzle (N) via line 311 and to condenser C via line 313.

The vapors from condenser C (stream 10) are passed via line 315 to scrubbing vessel, D, wherein they are scrubbed with an aqueous stream (stream 25) obtained from the dehydrogenation process and passed into the distribution means 329 in scrubber D via line 330. The scrubbed vapors (stream 18) are sent via line 332 to the cooler, G, to effect recovery of any hydrogen iodide in the scrubbed vapors. If the scrubbed vapors contain no hydrogen iodide, those vapors may be vented to the atmosphere, rather than to cooler, G, thus reducing the load on the cooler. The scrubber liquid effluent (stream 26) is passed via line 331 to the dehydrogenation process.

The following table sets out typical process conditions and material balances of the essential process streams for the particular embodiment of the process of the invention illustrated in FIGURE 3. The individual component streams are numbered, the numbers being shown in FIGURE 3 enclosed in diamonds.

TABLE

I. Vaporization zone—Zone A

A. OPERATING CONDITIONS

1. Temperatures, ° F.:
    (a) Vaporizer feed (stream 1) _____ 220
    (b) Vaporizer effluent (stream 4) _____ 350
    (c) Vaporizer air (stream 2) _____ 215
    (d) Vaporizer fuel (stream 3) _____ 65
2. Pressures, p.s.i.a.:
    (a) Vaporizer air _____ 50
    (b) Vaporizer fuel _____ 50

B. COMPONENTS

| Stream number | Name and constituents | Flow rate (parts by weight per unit time) | Composition (percent by weight) |
|---|---|---|---|
| 1 | Vaporizer feed: | | |
|  | $HI$ | 33,972 | 30.3 |
|  | $H_2O$ | 37,537 | 32.9 |
|  | $I_2$ | 41,833 | 36.8 |
|  | Total | 113,342 | 100.0 |
| 2 | Vaporizer air: | | |
|  | $O_2$ | 12,274 | 23.0 |
|  | $N_2$ | 40,403 | 75.7 |
|  | $H_2O$ | 720 | 1.3 |
|  | Total | 53,397 | 100.0 |
| 3 | Vaporizer fuel: Methane | 2,256 | 100.0 |

II. Oxidation zone—Zone B

A. OPERATING CONDITIONS

1. Temperatures, ° F.:
    (a) Oxidizer feed (stream 4) _____ 350
    (b) Oxidizer effluent (stream 5) _____ 710
2. Pressures, p.s.i.a.:
    (a) Oxidizer effluent _____ 40

B. COMPONENTS

| Stream number | Name and constituents | Flow rate (parts by weight per unit time) | Composition (percent by weight) |
|---|---|---|---|
| 5 | Oxidizer effluent: | | |
|  | $N_2$ | 40,403 | 23.9 |
|  | $O_2$ | 1,115 | 0.7 |
|  | $CO_2$ | 6,235 | 3.7 |
|  | $HI$ | 340 | 0.2 |
|  | $H_2O$ | 45,712 | 27.0 |
|  | $I_2$ | 75,223 | 44.5 |
|  | Total | 169,028 | 100.0 |

III. Quench nozzle—N

A. OPERATING CONDITIONS (a) Oxidizer effluent (stream 5) _____ 710
(b) Cooling water (stream 7) _____ 85
(c) Stripper vapor effluent (stream 6) _____ 245

B. COMPONENTS

| Stream number | Name and constituents | Flow rate (parts by weight per unit time) | Composition (percent by weight) |
|---|---|---|---|
| 5 | Oxidizer Effluent: | | |
|  | $N_2$ | 40,403 | 23.9 |
|  | $O_2$ | 1,115 | 0.7 |
|  | $CO_2$ | 6,235 | 3.7 |
|  | $HI$ | 340 | 0.2 |
|  | $H_2O$ | 45,712 | 27.0 |
|  | $I_2$ | 75,223 | 44.5 |
|  | Total | 169,028 | 100.0 |
| 6 | Stripper vapor effluent: | | |
|  | $H_2O$ | 23,572 | 62.9 |
|  | $I_2$ | 13,910 | 37.1 |
|  | Total | 37,482 | 100.0 |
| 7 | Cooling water: | | |
|  | $H_2O$ | 99,054 | 99.0 |
|  | $HI$ | 1,029 | 1.0 |
|  | Total | 100,083 | 100.0 |

IV. Condensation zone—Zone C

A. OPERATING CONDITIONS

1. Temperatures, ° F.:
    (a) Cooling water to condenser (stream 9) _____ 85
    (b) Condenser vapor effluent (stream 10) _____ 95
    (c) Condenser liquid effluent (stream 11) _____ 240
2. Pressure in condenser, p.s.i.a. _____ 25

B. COMPONENTS

| Stream number | Name and constituents | Flow rate (parts by weight per hour) | Composition (percent by weight) |
|---|---|---|---|
| 10 | Condenser vapor effluent: | | |
|  | $N_2$ | 40,403 | 79.1 |
|  | $O_2$ | 1,115 | 2.2 |
|  | $CO_2$ | 6,235 | 12.2 |
|  | $H_2O$ | 987 | 1.9 |
|  | $I_2$ | 2,324 | 4.6 |
|  | Total | 51,064 | 100.0 |
| 9 | Cooling water to condenser: | | |
|  | $H_2O$ | 480,411 | 99.0 |
|  | $HI$ | 4,993 | 1.0 |
|  | Total | 740,933 | 100.0 |
| 11 | Condenser liquid effluent: | | |
|  | $HI$ | 6,362 | 0.9 |
|  | $H_2O$ | 647,758 | 87.4 |
|  | $I_2$ | 86,813 | 11.7 |
|  | Total | 740,933 | 100.0 |

V. Scrubbing zone—Zone D

A. OPERATING CONDITIONS

1. Temperatures, °F.:
   - (a) Condenser vapor effluent (stream 10) _____ 95
   - (b) Scrubber vapor effluent (stream 18) _____ 150
   - (c) Scrubbing liquid (stream 25) _____ 150
   - (d) Scrubber liquid effluent (stream 26) _____ 95

B. COMPONENTS

| Stream number | Name and constituents | Flow rate (parts by weight per unit time) | Composition (percent by weight) |
|---|---|---|---|
| 10 | Condenser vapor effluent. (See IV B.) | | |
| 18 | Scrubber vapor effluent: | | |
|   | $N_2$ | 40,403 | 78.3 |
|   | $O_2$ | 1,115 | 2.1 |
|   | $CO_2$ | 6,235 | 12.1 |
|   | $H_2O$ | 3,857 | 7.5 |
|   | Total | 51,610 | 100.0 |
| 25 | Scrubbing Liquid: | | |
|   | HI | 17,165 | 44.6 |
|   | $H_2O$ | 21,278 | 55.4 |
|   | Total | 38,443 | 100.0 |
| 26 | Scrubber liquid effluent: | | |
|   | HI | 17,165 | 45.3 |
|   | $H_2O$ | 18,428 | 48.6 |
|   | $I_2$ | 2,324 | 6.1 |
|   | Total | 37,917 | 100.0 |

VI. Separation zone—Zone E

A. OPERATING CONDITIONS

1. Temperatures, °F.:
   - (a) Condenser liquid effluent (stream 11) _____ 240
   - (b) Iodine product (stream 12) _____ 240
   - (c) Separator aqueous effluent (stream 13) _____ 240
2. Pressure, p.s.i.a _____ 25

B. COMPONENTS

| Stream number | Name and constituents | Flow rate (parts by weight per unit time) | Composition (percent by weight) |
|---|---|---|---|
| 11 | Condenser liquid effluent. (See IV B.) | | |
| 12 | Iodine product $I_2$ | 72,375 | 100.0 |
| 13 | Separator aqueous effluent: | | |
|   | HI | 6,362 | 1.0 |
|   | $H_2O$ | 647,758 | 96.9 |
|   | $I_2$ | 14,438 | 2.1 |
|   | Total | 668,558 | 100.0 |

VII. Stripping zone—Zone F

A. OPERATING CONDITIONS

1. Temperatures, °F.:
   - (a) Stripper feed (stream 15) _____ 240
   - (b) Stripper vapor effluent (stream 6) _____ 245
   - (c) Stripper steam (stream 16) _____ 298
   - (d) Stripper liquid effluent (stream 17) _____ 250
2. Pressure, p.s.i.a.:
   - (a) Stripper steam _____ 50
   - (b) Stripper effluent _____ 27

B. COMPONENTS

| Stream number | Name and constituents | Flow rate (parts by weight per unit time) | Composition (percent by weight) |
|---|---|---|---|
| 15 | Stripper feed: | | |
|   | HI | 6,130 | 1.0 |
|   | $I_2$ | 624,166 | 97.9 |
|   | $H_2O$ | 13,912 | 2.1 |
|   | Total | 644,208 | 100.0 |
| 6 | Stripper vapor effluent: | | |
|   | $I_2$ | 13,910 | 62.9 |
|   | $H_2O$ | 23,572 | 37.1 |
|   | Total | 37,482 | 100.0 |
| 16 | Stripper steam: $H_2O$ | 24,562 | 100.0 |
| 17 | Stripper liquid effluent: | | |
|   | HI | 6,130 | 1.0 |
|   | $H_2O$ | 625,156 | 99.0 |
|   | $I_2$ | 2 | |
|   | Total | 631,288 | 100.0 |

VIII. Cooling zone—Zone G

A. OPERATING CONDITIONS

1. Temperatures, °F.:
   - (a) Stripper liquid effluent (stream 17) _____ 250
   - (b) Cooled water (stream 22) _____ 85
   - (c) Scrubber vapor effluent (stream 18) _____ 150
   - (d) Cooler vent gases (stream 20) _____ 110
   - (e) Cooling water (stream 21) _____ 55
   - (f) Cooling air (stream 19) (72° F. wet bulb, 92° F. dry bulb) _____ 72
2. Pressure—substantially atmospheric.

B. COMPONENTS

| Stream number | Name and constituents | Flow rate (parts by weight per unit time) | Composition (percent by weight) |
|---|---|---|---|
| 17 | Stripper liquid effluent. (See VII B.) | | |
| 22 | Cooled water: | | |
|   | HI | 6,130 | 1.0 |
|   | $H_2O$ | 590,411 | 99.0 |
|   | Total | 596,541 | 100.0 |
| 18 | Scrubber vapor effluent. (See V B.) | | |
| 20 | Cooler vent gases: | | |
|   | $N_2$ | 1,569,280 | 72.7 |
|   | $O_2$ | 465,559 | 21.5 |
|   | $CO_2$ | 6,235 | 0.3 |
|   | $H_2O$ | 118,260 | 5.5 |
|   | $I_2$ | 2 | |
|   | Total | 2,159,336 | 100.0 |
| 21 | Cooling water: $H_2O$ | 77,210 | 100.0 |
| 19 | Cooling air: | | |
|   | $N_2$ | 1,528,877 | 76.6 |
|   | $O_2$ | 464,444 | 23.3 |
|   | $H_2O$ | 2,448 | 0.1 |
|   | Total | 1,995,769 | 100.0 |

IX. Streams sent to dehydrogenation plant

| Stream number | Name and constituents | Flow rate (parts by weight per unit time) | Composition (percent by weight) |
|---|---|---|---|
| 26 | Scrubber liquid effluent. (See V B.) | | |
| 14 | Separator liquid effluent: | | |
|   | HI | 232 | 1.0 |
|   | $H_2O$ | 23,592 | 96.9 |
|   | $I_2$ | 526 | 2.1 |
| 23 | Cooling water: | | |
|   | HI | 108 | 1.0 |
|   | $H_2O$ | 10,946 | 99.0 |
|   | Total | 11,054 | 100.0 |

While the process of this invention is applicable to effect recovery of the iodine content of any hydrogen iodide-water mixture, the process is of primary interest for recovering the iodine content of mixtures of hydrogen iodide, water and iodine obtained from processes in which iodine is used as a reactant. For example, it has recently been discovered that elemental iodine is useful for modifying the carbon-to-carbon structure of various organic materials, particularly hydrocarbons. In this use, iodine acts as a dehydrogenating agent, removing one or more hydrogen atoms from one or more carbon atoms of the material treated; one molecule of hydrogen iodide is formed per atom of hydrogen removed. The inorganic portions of the final reaction mixtures resulting from such processes normally comprise hydrogen iodide, together with substantial amounts of elemental iodine (that unreacted in the process) and water. Water normally is present because the hydrogen iodide and iodine are conveniently recovered from the effluent from the reaction zone of these processes by scrubbing that effluent with water or an aqueous solution of hydrogen iodide. Also, where the product of the dehydrogenation is highly reactive, water or steam is added to the effluent to substantially reduce the temperature of the effluent, and/or to dilute it, thus reducing side reactions and/or back reactions between the reaction product and either or both of the iodine and hydrogen iodide. The expense of iodine requires recovery of even very small amounts of the element. The process of the present invention provides an operationally simple, efficient process suitable for use on a large scale for recovering the total iodine content of such reaction mixtures.

We claim as our invention:

1. A process for recovering as substantially anhydrous iodine the total iodine content of a mixture essentially comprised of substantial amounts of each of at least the first two of hydrogen iodide, water and iodine, comprising contacting said mixture in an oxidation zone, in vapor phase, with a molecular oxygen-containing gas, and thereby oxidizing substantially quantitatively the hydrogen iodide in said mixture to iodine, directly contacting in a condensation zone the resulting vaporous mixture with a liquid aqueous phase containing from none to a minor amount of hydrogen iodide, and thereby condensing the iodine therein, said direct contact being the only means for cooling said vaporous mixture and condensing said iodine therein, passing the resulting condensed mixture, comprised primarily of iodine and a liquid aqueous phase, to a separation zone wherein iodine is separated as an immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, and passing the effluent gases, containing iodine, from the said stripping zone to the aforesaid condensation zone, wherein the iodine in said effluent gases is condensed.

2. A process for recovering as substantially anhydrous iodine the total iodine content of a mixture essentially comprised of substantial amounts of each of at least the first two of hydrogen iodide, water and iodine, comprising contacting said mixture in an oxidation zone, in vapor phase, with a molecular oxygen-containing gas, and thereby oxidizing substantially quantitatively the hydrogen iodide in said mixture to iodine, directly contacting in a condensation zone the resulting vaporous mixture with a liquid aqueous phase containing from none to a minor amount of hydrogen iodide, and thereby condensing the iodine therein, said direct contact being the only means for cooling said vaporous mixture and condensing said iodine therein, withdrawing any vaporous material from said condensation zone and passing said vaporous material to a scrubbing zone wherein the said vaporous material is scrubbed with a liquid aqueous phase, thereby removing from said vaporous material any hydrogen iodide and iodine contained therein, discarding the scrubbed vaporous material and effecting in the aforesaid oxidation zone the oxidation of the hydrogen iodide to iodine in the liquid mixture obtained as effluent in said scrubbing zone, passing the condensed mixture obtained in the aforesaid condensation zone, said condensed mixture being primarily iodine and a liquid aqueous phase, to a separation zone wherein iodine is separated as an immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, passing the effluent gases, containing iodine, from the said stripping zone to the aforesaid condensation zone, wherein the iodine in said effluent gases is condensed, withdrawing the stripped liquid aqueous phase from the said stripping zone, contacting said stripped aqueous phase with a gas, said aqueous phase being cooled by evaporation of a part of the water therein, discarding the resulting gas-water vapor mixture and passing the cooled aqueous phase to the aforesaid condensation zone to provide at least a part of the liquid aqueous phase required to condense the iodine in said zone, with the proviso that the amount of cooled aqueous phase so passed to the condensation zone is so controlled that the total liquid aqueous phase passed to the condensation zone contains at most a minor amount of hydrogen iodide.

3. A process for recovering as substantially anhydrous iodine the total iodine content of a mixture essentially comprised of substantial amounts of each of at least the first two of hydrogen iodide, water and iodine, comprising contacting said mixture in an oxidation zone, in vapor phase, and in the presence of a catalyst, with a molecular oxygen-containing gas, and thereby oxidizing substantially quantitatively the hydrogen iodide in said mixture to iodine, directly contacting in a condensation zone the resulting vaporous mixture with a liquid aqueous phase containing from none to a minor amount of hydrogen iodide, and thereby condensing the iodine therein, said direct contact being the only means for cooling said vaporous mixture and condensing said iodine therein, passing the resulting condensed mixture, comprised primarily of iodine and a liquid aqueous phase, to a separation zone wherein iodine is separated as an immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, and passing the effluent gases, containing iodine, from the said stripping zone to the aforesaid condensation zone, wherein the iodine in said effluent gases is condensed.

4. A process for recovering as substantially anhydrous iodine the total iodine content of a liquid mixture essentially comprised of substantial amounts of each of at least the first two of hydrogen iodide, water and iodine, comprising vaporizing in a vaporization zone said liquid mixture by direct contact of the liquid mixture with a heating medium, contacting the resulting vaporous mixture in an oxidation zone with a molecular oxygen-containing gas, and thereby oxidizing substantially quantitatively the hydrogen iodide in said mixture to iodine, directly contacting in a condensation zone the resulting vaporous mixture with a liquid aqueous phase containing from none to a minor amount of hydrogen iodide, and thereby condensing the iodine therein, said direct contact being the only means for cooling said vaporous mixture and condensing said iodine therein, withdrawing any vaporous material from said condensation zone and passing said vaporous material to a scrubbing zone wherein the said vaporous material is scrubbed with a liquid aqueous phase, thereby removing from said vaporous material hydrogen iodide and iodine contained therein, discarding the scrubbed vaporous material, passing the liquid mixture obtained as effluent in said scrubbing zone to the aforesaid vaporization zone, passing the condensed mixture obtained in the aforesaid condensation zone, said condensed mixture being primarily iodine and a liquid aqueous phase, to a separation zone wherein iodine is separated as an immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, passing the effluent gases, containing iodine, from the said stripping zone to the aforesaid condensation zone, wherein the iodine in said effluent gases is condensed, withdrawing the stripped liquid aqueous phase from the said stripping zone, contacting said stripped aqueous phase with a gas, said aqueous phase being cooled by evaporation of a part of the water therein, discarding the resulting gas-water vapor mixture and passing the cooled aqueous phase to the aforesaid condensation zone to provide at least a part of the liquid aqueous phase required to condense the iodine in said zone, with the proviso that the amount of cooled aqueous phase so passed to the condensation zone is so controlled that the total liquid aqueous phase passed to the condensation zone contains at most a minor amount of hydrogen iodide.

5. A process according to claim 4 wherein the said oxidation of the hydrogen iodide is conducted in the presence of a catalyst, the gas used to strip iodine from the liquid aqueous phase in the said stripping zone is steam and the gas used to cool the said stripped aqueous phase is air.

6. A process according to claim 5 wherein the catalyst is a porous, substantially neutral, solid material having high surface area-to-weight ratio.

7. A process for recovering as substantially anhydrous iodine the total iodine content of a liquid mixture essentially comprised of substantial amounts of each of at least the first two of hydrogen iodide, water and iodine, comprising vaporizing in a vaporization zone said liquid mixture by direct contact of the liquid mixture with a heating medium, mixing the resulting vaporous mixture with a molecular oxygen-containing gas, passing the resulting admixture to a burner submerged in a liquid aqueous phase, igniting and burning the said admixture in said burner to effect substantially quantitative oxidation of the hydrogen iodide in said admixture to iodine, said liquid aqueous phase cooling the gases resulting from the combustion and condensing the resulting iodine, recovering as product said condensed iodine, as an immiscible phase, from the liquid aqueous phase resulting from cooling of the combustion gases, withdrawing a part of the said liquid aqueous phase and passing it to a stripping zone wherein said withdrawn liquid aqueous phase is contacted with a gas to strip iodine from the said liquid phase, and passing the effluent gases, containing iodine, from the said stripping zone into contact with the liquid aqueous phase in which the burner is submerged, thereby effecting condensation of the iodine in the said effluent gases.

8. A process for recovering as substantially anhydrous iodine the total iodine content of a liquid feed mixture essentially comprised of substantial amounts of each of at least the first two of hydrogen iodide, water and iodine, comprising vaporizing in a vaporization zone said liquid mixture by direct contact of the liquid mixture with a heating medium, mixing the resulting vaporous mixture with a molecular oxygen-containing gas, passing the resulting admixture to a burner submerged in a liquid aqueous phase igniting and burning the said admixture in said burner to effect substantially quantitative oxidation of the hydrogen iodide in said admixture to iodine, said liquid aqueous phase cooling the gases resulting from the combustion and condensing the resulting iodine, withdrawing any vaporous material resulting from said combustion but not condensed by said liquid aqueous phase and passing said vaporous material to a scrubbing zone wherein the said vaporous material is scrubbed with a liquid aqueous phase, thereby removing from said vaporous material any hydrogen iodide and iodine contained therein, discarding the scrubbed vaporous material, combining the liquid mixture obtained as effluent in said scrubbing zone, with the liquid feed mixture before said liquid feed mixture is vaporized in the vaporization zone recovering as product said condensed iodine, as an immiscible phase, from the liquid aqueous phase resulting from cooling of the combustion gases, withdrawing a part of the said liquid aqueous phase and passing it to a stripping zone wherein said withdrawn liquid aqueous phase is contacted with a gas to strip iodine from the said liquid phase, passing the effluent gases, containing iodine, from the said stripping zone into contact with the liquid aqueous phase in which the burner is submerged, thereby effecting condensation of the iodine in the said effluent gases, withdrawing the stripped aqueous phase from the said stripping zone, contacting said stripped aqueous phase with a gas, said aqueous phase being cooled by evaporation of a part of the water therein, discarding the resulting gas-water vapor mixture and passing the cooled aqueous phase to the aqueous phase surrounding the aforesaid burner.

9. A process for recovering as substantially anhydrous iodine the total iodine content of a mixture essentially comprised of substantial amounts of each of at least the first two of hydrogen iodide, water and iodine, comprising passing said mixture to a burner wherein the hydrogen iodide content of said mixture is burned with molecular oxygen, to oxidize the hydrogen iodide substantially quantitatively to iodine, directly contacting in a condensation zone the resulting vaporous mixture with a liquid aqueous phase, and thereby condensing the iodine therein, said direct contact being the only means for cooling said vaporous mixture and condensing said iodine therein, withdrawing any vaporous material from said condensation zone and passing said vaporous material to a scrubbing zone wherein the said vaporous material is scrubbed with a liquid aqueous phase, thereby removing from said vaporous material any hydrogen iodide and iodine contained therein, discarding the scrubbed vaporous material and effecting in the aforesaid burner the oxidation of the hydrogen iodide to iodine in the liquid mixture obtained as effluent in said scrubbing zone, passing the condensed mixture obtained in the aforesaid condensation zone, said condensed mixture being primarily iodine and a liquid aqueous phase, to a separation zone wherein iodine is separated as an immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, passing the effluent gases, containing iodine, from the said stripping zone to the aforesaid condensation zone, wherein the iodine in said effluent gases is condensed, withdrawing the stripped liquid aqueous phase from the said stripping zone, contacting said stripped aqueous phase with a gas, said aqueous phase being cooled by evaporation of a part of the water therein, discarding the resulting gas-water vapor mixture and passing the cooled aqueous phase to the aforesaid condensation zone to provide at least a part of the liquid aqueous phase required to condense the iodine in said zone.

10. A process according to claim 9 wherein the original feed mixture is in the liquid state, and a fuel, together with sufficient molecular oxygen-containing gas to completely burn that fuel, in addition to the molecular oxygen-containing gas fed to that burner to react with the hydrogen iodide contained in the original feed mixture, is fed to the burner to completely vaporize the liquid feed mixture.

11. A process for recovering as substantially anhydrous iodine the total iodine content of a liquid mixture essentially comprised of substantial amounts of each of at least the first two of hydrogen iodide, water and iodine, comprising vaporizing in a vaporization zone said liquid mixture by direct contact of the liquid mixture with hot gases, contacting the resulting vaporous mixture in an oxidation zone with a molecular oxygen-containing gas, and thereby oxidizing substantially quantitatively the hydrogen iodide in said mixture to iodine, directly contacting in a condensation zone the resulting vaporous mixture with a liquid aqueous phase containing from none to a minor amount of hydrogen iodide, and thereby condensing the iodine therein, withdrawing any vaporous material from said condensation zone and passing said vaporous material to a scrubbing zone wherein the said vaporous material is scrubbed with a liquid aqueous phase, thereby removing from said vaporous material hydrogen iodide and iodine contained therein, discarding the scrubbed vaporous material, passing the liquid mixture obtained as effluent in said scrubbing zone to the aforesaid vaporization zone, passing the condensed mixture obtained in the aforesaid condensation zone, said condensed mixture being primarily iodine and a liquid aqueous phase, to a separation zone wherein iodine is separated as immiscible phase from the liquid aqueous phase, withdrawing, as product, substantially anhydrous iodine from said separation zone, withdrawing at least a part of the said liquid aqueous phase in said separation zone from said zone, passing said withdrawn liquid aqueous phase to a stripping zone wherein said aqueous phase is contacted with a gas to strip iodine from the liquid phase, passing the effluent gases, containing iodine, from the said stripping zone to the aforesaid condensation zone, wherein the iodine in said effluent gases is condensed, withdrawing the stripped liquid aqueous phase from the said stripping zone, contacting said stripped aqueous phase with a gas, said aqueous phase being cooled by evaporation of a part of the water therein, discarding the resulting gas-water vapor mixture and passing the cooled aqueous phase to the aforesaid condensation zone to provide at least a part of the liquid aqueous phase required to condense the iodine in said zone, with the proviso that the amount of cooled aqueous phase so passed to the condensation zone is so controlled that the total liquid aqueous phase passed to the condensation zone contains at most a minor amount of hydrogen iodide.

12. A process according to claim 11 wherein the vaporization of the original feed mixture is conducted by passing the liquid downwardly over a porous bed of refractory bodies against the flow of hot gases resulting from combustion of a fuel, the gas used to strip iodine from the liquid aqueous phase in the said stripping zone is steam and the gas used in cooling the stripped aqueous phase is air.

13. A process according to claim 12 wherein the said oxidation of the hydrogen iodide is conducted in the presence of a catalyst.

14. A process according to claim 13 wherein the said catalyst is a porous, substantially neutral, solid material having high surface area-to-weight ratio.

15. A process according to claim 13 wherein the said catalyst is a solid material having a substantial intrinsic surface acidity.

16. A process according to claim 12 wherein the said oxidation of the hydrogen iodide is conducted in the presence of an inert, non-catalytic contact material.

References Cited in the file of this patent

UNITED STATES PATENTS

| | | |
|---|---|---|
| 1,311,175 | Meyer | July 29, 1919 |
| 1,916,922 | Dow | July 4, 1933 |
| 2,240,668 | Reed | May 6, 1941 |
| 2,395,314 | Blumer | Feb. 19, 1946 |
| 2,892,686 | Greene et al. | June 30, 1959 |
| 2,892,687 | Deahl et al. | June 30, 1959 |
| 2,918,354 | Steinle et al. | Dec. 22, 1959 |

OTHER REFERENCES

Swindin: "Recent Developments in Submerged Combustion," Industrial Chemist, vol. 26, January 1950, pp. 25–28 published by W. J. Fraser and Co., Ltd., Dagenham, Essex, England.

Thorpe Dictionary of Applied Chemistry, vol. II, revised ed., 1912, pages 18–19, publ. by Longmans, Green and Co., N.Y.

Babor et al.: "General College Chemistry," 1940, 2nd ed., Thomas Y. Crowell Co., page 329.